Sept. 8, 1942.     B. G. CARLSON     2,294,960
HOSE COUPLING
Filed April 25, 1941

INVENTOR.
BERT G. CARLSON
BY
ATTORNEYS

Patented Sept. 8, 1942

2,294,960

UNITED STATES PATENT OFFICE 2,294,960

HOSE COUPLING

Bert G. Carlson, Willobee, Ohio, assignor to The Weatherhead Company, Cleveland, Ohio, a corporation of Ohio Application April 25, 1941, Serial No. 390,297

1 Claim. (Cl. 285—84)

This invention relates to hose couplings and more particularly to hose couplings of the quick attachable type which can readily be secured to the end of a hose without requiring any special tools.

A general object of the invention is to provide a simple and effective hose coupling of the quick attachable type which can be secured to a hose end with a minimum of trouble and which will produce a leakproof and mechanically strong joint. Another object is to provide such a hose coupling which can be economically and readily manufactured, for example, on automatic screw machines.

Figure 1:
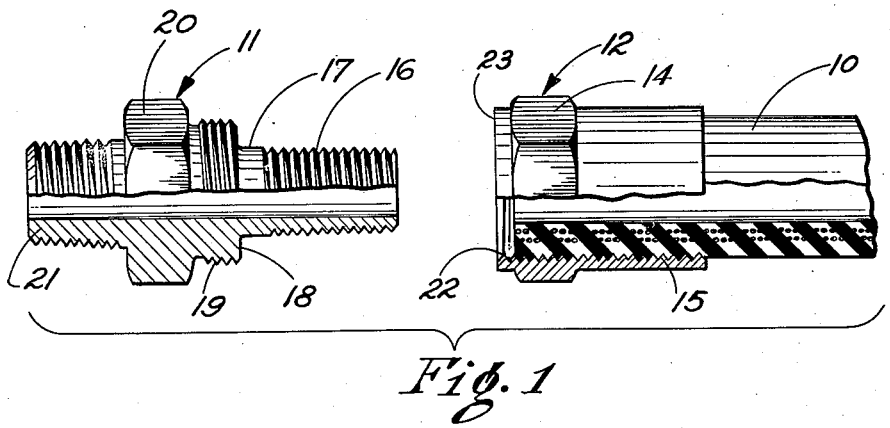
Figure 2:
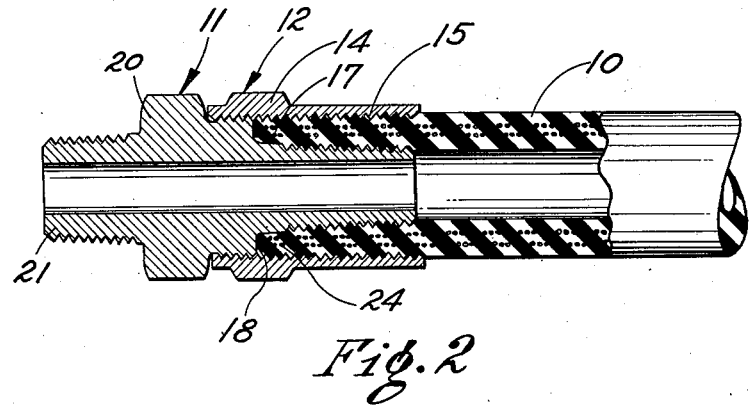

Further objects and advantages of my invention will become apparent from a description of a preferred form thereof, reference being made to the accompanying drawing wherein Fig. 1 is an illustration, partly in section, of the parts making up my coupling before the assembly has been completed; and Fig. 2 is a longitudinal cross-sectional view showing the coupling as secured to a hose end.

My coupling is particularly adapted for use in conjunction with flexible hoses made of rubber or synthetic rubberlike substances such as neoprene, thiokol, and the like, either with or without fabric reinforcements, such a hose being indicated generally at 10 in the drawing. The hose coupling itself comprises a body indicated generally at 11 and a sleeve indicated generally at 12. The sleeve 12 surrounds the hose end, as shown in the drawing, and is provided with a hexagonal or other noncircular wrench engaging portion 14 and internal threads 15 extending substantially throughout its length.

The body 11 is provided with an externally threaded nipple or standpipe 16 preferably provided with tapered threads as shown and terminating in a slightly tapered unthreaded portion 17 adjacent the radial end face or shoulder 18. Adjacent the shoulder 18, there is an enlarged threaded portion 19 which is adapted to engage the internal threads 15 of the sleeve 12. The body is also provided with a hexagonal or other non-circular wrench engaging portion 20 and terminates in a portion 21 adapted for connection to another instrumentality, in this case shown as a pipe threaded portion, so that the body of the coupling can be screwed into the body of a carburetor, for example, or otherwise make a connection with another fluid passage. Those skilled in the art will appreciate that various other connecting means may be substituted for the pipe threaded portion, for example, flared tube couplings or swivel couplings of various sorts may be employed or, if desired, the body portion can be made in the form of a union to connect two flexible hoses together, in which case the parts 16, 17, 18 and 19 would be duplicated on the other side of the hexagonal portion 20.

In making a connection and assembling a fitting embodying the present invention the hose 10 is cut to the desired length with the end preferably square, the end of the hose is preferably dipped in oil or other suitable lubricating material, and sleeve 12 screwed onto the end of the hose approximately to the position shown in Fig. 1, preferably with about 1½ threads being exposed at the end of the sleeve as indicated at 22. Then the connection is completed by screwing the nipple or standpipe 16 into the inner wall of the hose. This operation is carried out as far as possible by hand and then with the aid of wrenches or a vise and a wrench, the threaded portions 19 and 15 are screwed together until the end 23 of the sleeve is adjacent the hexagonal portion 20 of the body, as shown in Fig. 2.

This assembly operation results in the compression of the material of the hose between the standpipe 16 and the inner threads 15 of the sleeve 12, particularly in the zone adjacent the end of the hose indicated at 24 in Fig. 2. Further, the material of the hose is compressed firmly against the radial end wall 18 while the threads of the sleeve at 15 bite into the inner and outer surfaces of the hose, thereby producing a joint which has great mechanical strength and which will withstand considerable pressure, in fact, pressures up to the bursting strength of the hose with many types of reinforced rubber or synthetic hoses.

It will be evident that the parts can be made rapidly and economically from bar stock on automatic screw machines, the assembly is light in weight and effectively resists vibration and has the further advantage that with care the fittings can be assembled and disassembled several times without damaging the hose ends and may be used over and over again with different hoses.

I claim:

A quick attachable hose coupling comprising a sleeve and a body, said sleeve having a wrench engaging outer surface and a substantially straight internal bore threaded throughout its length and adapted to engage the outer surface of a flexible hose, said body having a tapered standpipe projecting therefrom and adapted to engage the internal bore of the hose and expand the hose against said sleeve, said standpipe being externally threaded for a portion of its length and being smooth adjacent its inner end, the smooth portion of said standpipe having a minimum diameter substantially equal to the maximum diameter of the threads on said standpipe and terminating in a radially extending portion, said body having an enlarged threaded portion adapted to engage the threads on said sleeve disposed adjacent said radially extending portion, a wrench-engaging portion, and means disposed on the opposite side of said body from said standpipe for connecting said coupling to another fluid passageway, said sleeve and said standpipe being so proportioned that on assembly the hose is clamped with sufficient force to cause the material of the hose to flow and fill the entire annular space between the sleeve and the standpipe and be compressed against said radial end wall.

BERT G. CARLSON.